United States Patent [19]
Yasuda

[11] Patent Number: 6,160,638
[45] Date of Patent: *Dec. 12, 2000

[54] DATA COMMUNICATION APPARATUS AND METHOD

[75] Inventor: Masataka Yasuda, Kawasaki, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/797,608

[22] Filed: Feb. 7, 1997

[30] Foreign Application Priority Data

Feb. 9, 1996 [JP] Japan .................................. 8-023813

[51] Int. Cl.$^7$ .................................................. H04N 1/40
[52] U.S. Cl. ...................................... 358/438; 395/200.57
[58] Field of Search ...................................... 358/438, 439, 358/444, 437; 395/825, 827, 853, 878, 200.57, 200.58

[56] References Cited

U.S. PATENT DOCUMENTS

| | | |
|---|---|---|
| 5,127,047 | 6/1992 | Bell et al. .................................. 358/439 |
| 5,165,096 | 11/1992 | Matsumoto ................................ 358/438 |
| 5,311,327 | 5/1994 | Fukushima et al. ...................... 358/439 |
| 5,473,674 | 12/1995 | Maeda ....................................... 358/438 |
| 5,565,999 | 10/1996 | Takahashi ................................. 358/439 |
| 5,677,773 | 10/1997 | Sakayama et al. ....................... 358/438 |
| 5,706,104 | 1/1998 | Sugiura et al. ........................... 358/444 |
| 5,717,744 | 2/1998 | Yoshida et al. .......................... 358/438 |
| 5,761,282 | 6/1998 | Hsu ........................................... 358/438 |
| 5,815,280 | 9/1998 | Ohmura et al. .......................... 358/437 |

*Primary Examiner*—Yon J. Couso
*Attorney, Agent, or Firm*—Fitzpatrick, Cella, Harper & Scinto

[57] ABSTRACT

An image output request (representing that image data is stored in a memory) is transmitted from the system on the transmitting side to the system on the receiving side. This image output request includes information such as the name of transmission source and an area where the image data is stored. Upon reception of this image output request, the system on the receiving side notifies the system on the transmitting side of reception of this request. The network is temporarily disconnected. When a predetermined time has elapsed, the system on the receiving side connects the network on the basis of the received image output request and reads out and outputs the image data stored in the memory in the system on the transmitting side. Upon reception of the image data, the system on the receiving side notifies the system on the transmitting side of reception of this data.

10 Claims, 14 Drawing Sheets

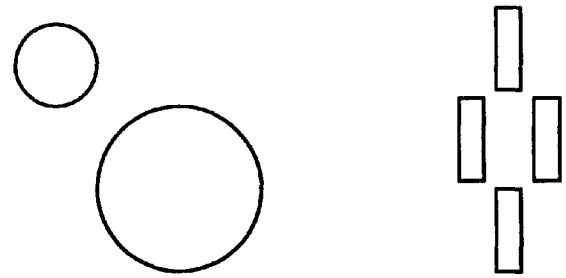

DATA COMMUNICATION APPARATUS AND METHOD

BACKGROUND OF THE INVENTION

1. Field of the Invention

The present invention relates to a data communication apparatus and method for performing data communication.

2. Description of the Related Art

In a data communication apparatus represented by a facsimile apparatus, when a transmission source is to transmit data, destination designation information and image data serving as a transmission target are transmitted.

An error (e.g., no paper or memory-full state) that may occur at the receiving side during transmission of image data is conventionally processed as a communication abnormality. When such an error occurs, the same data must be transmitted again.

This is because the image data is transmitted regardless of the state at the receiving side.

SUMMARY OF THE INVENTION

It is an object of the present invention to provide a data communication apparatus and method free from the conventional problems described above.

It is another object of the present invention to provide a data communication apparatus and method which can reduce communication errors.

It is still another object of the present invention to provide a data communication apparatus and method which can receive data in response to a request from the receiving side.

It is still another object of the present invention to provide a data communication apparatus and method which allow the receiving side to recognize the presence of data to be transmitted from the transmitting side.

It is still another object of the present invention to provide a data communication apparatus and method which can recognize that data transmitted from the transmitting side is actually received by the receiving side.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 14 is a view showing a window for selecting a desired case name from an image output request list.

DETAILED DESCRIPTION OF THE PREFERRED EMBODIMENTS

The preferred embodiments of the present invention will be described in detail below with reference to the accompanying drawings.

[First Embodiment]

Figure 1:
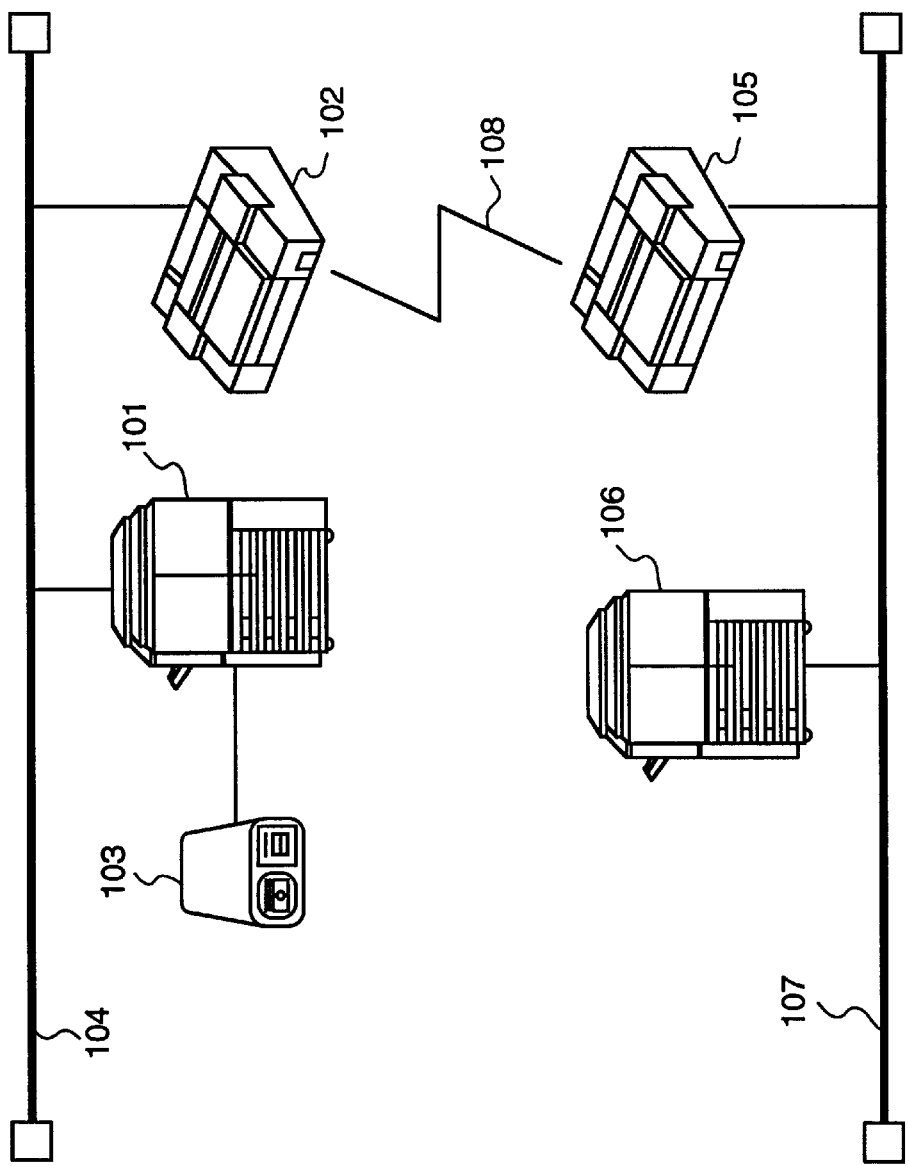
FIG. 1 is a block diagram showing the arrangement of an image transfer system according to the first embodiment of the present invention.

FIG. 1 is a block diagram showing the arrangement of an image transfer system according to the first embodiment of the present invention. Reference numeral 101 denotes a copying machine having a large liquid crystal touch panel and is connected to a local area network (LAN) 104. The copying machine 101 has a scanner function of transferring a read image to an apparatus on the LAN and a printer function of printing out data sent from an apparatus on the LAN. The copying machine 101 has a local copying function as a stand-alone machine. When a nonvolatile storage medium having a large capacity such as a magnetooptical unit 103 is connected to the copying machine 101, the copying machine 101 has an image filing function of storing image data as a file. The copying machine 101 has a printer function of a computer or the like. The copying machine can receive image formation command data sent from a computer (not shown) through the LAN 104 and can develop and print input data as a bitmap image data.

Reference numeral 102 denotes a facsimile apparatus (FAX) having a large liquid crystal touch panel and connected to the LAN 104. The FAX serves as an image data transfer apparatus connected to a public network 108 such as a PSTN. The FAX 102 has a simple copying function and a FAX function as a stand-alone machine. The FAX 102 also serves as a gateway with another LAN 107 through the public network 108. Reference numeral 105 denotes a FAX having functions identical to that of the FAX 102; and 106, a copying machine having functions identical to those of the copying machine 101.

Figure 2:
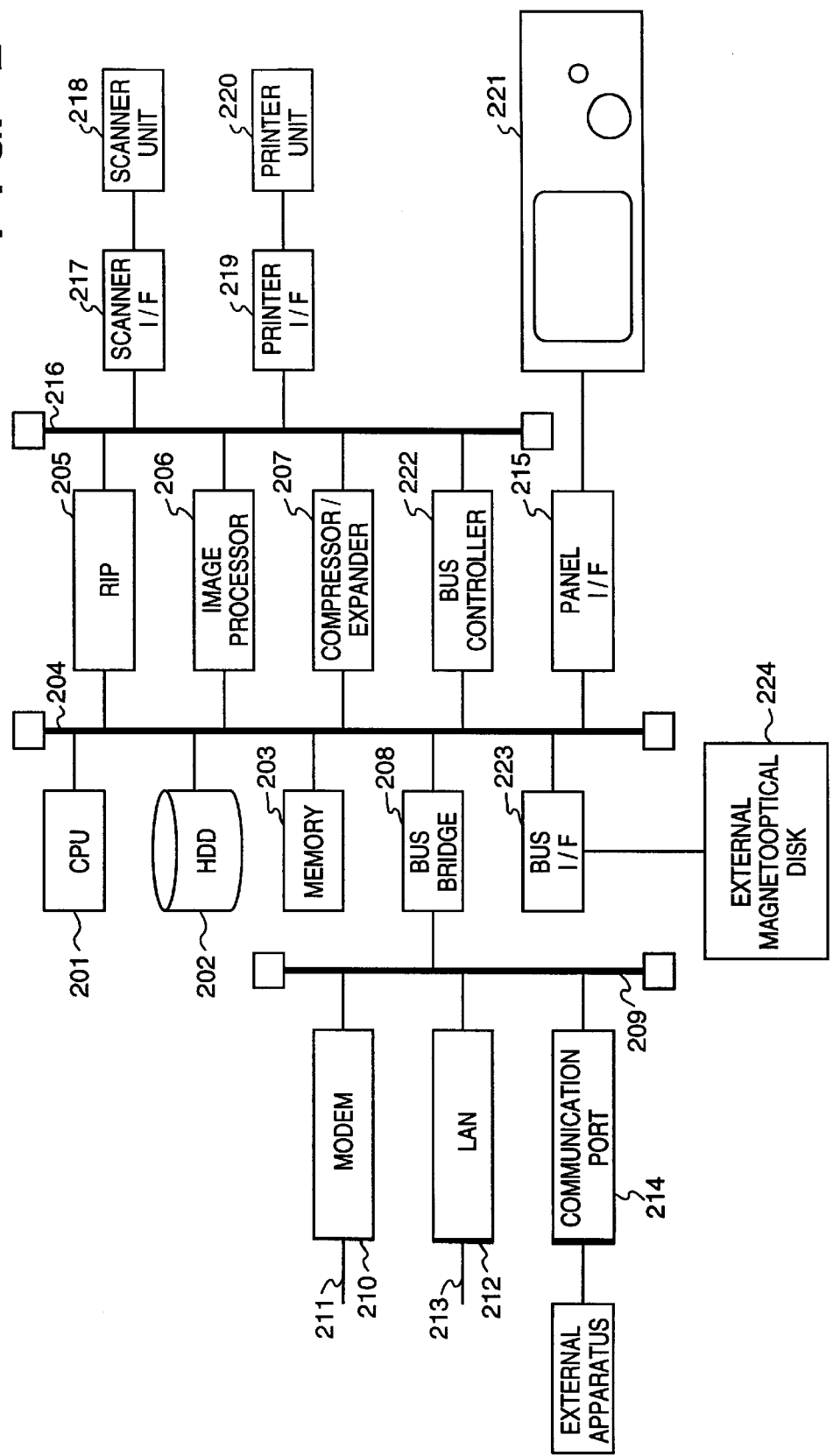
FIG. 2 is a block diagram showing the respective components of a copying machine and a FAX.

The common components of the above machines will be described with reference to FIG. 2. A CPU 201 is a microprocessor for controlling the entire image forming apparatus and operates with a real-time OS. An HDD 202 is a large-capacity hard disk for storing program data and a plurality of application programs for operating the CPU 201. The HDD 202 operates under the control of the CPU 201. The HDD 202 can temporarily store image data, as needed. The HDD 202 temporarily stores information associated with an image output request notified from an external apparatus such as an image reader (to be described later).

A memory 203 serves as a work memory used in executing processing under the control of the CPU 201. The memory 203 can be accessed from the CPU 201 at a high speed. A high-speed CPU bus 204 serves to transfer (DMA transfer) data between the CPU 201, the HDD 202, the memory 203, and various functional units (to be described later).

An RIP 205 is a functional unit for receiving an image formation command input from an external interface connected to a computer (to be described later) and converting input data into a bitmap image in accordance with the contents of the image formation command. The image formation command is input from the high-speed CPU bus 204 and output image data to a high-speed image bus 216 (to be described later). The types of RIPs are post script, PCL, LIPS, CaPSL, and the like.

An image processor 206 is a functional unit for performing image filtering processing such as smoothing processing and edge processing for image data input from the high-speed image bus 216 in accordance with an instruction from the CPU 201. In addition, the image processor 206 also has an image recognition (OCR) function for an image input from the high-speed image bus 216 and an image separation function of separating data into a character portion and an image (halftone) portion.

A compressor/expander 207 compresses image data input from the high-speed image bus 216 in accordance with an image compression method such as MH, MR, MMR, or JPEG and outputs the compressed data to the high-speed CPU bus 204 or the high-speed image bus 216. The compressor/expander 207 also expands the compressed data from the CPU or image bus 204 or 216 in accordance with the data compression scheme and outputs the expanded data to the high-speed image bus 216.

A bus bridge 208 is a bus bridge controller for connecting the high-speed CPU bus 204 and a low-speed CPU bus 209 (to be described later) to absorb the difference in processing speed between the buses. The CPU 201 operating at a high speed can access, through the bus bridge 208, low-speed functional units connected to the low-speed CPU bus 209.

Note that the low-speed CPU bus 209 has a bus having a lower transfer rate than that of the high-speed CPU bus 204 and is used to connect functional units having a relatively low processing speed.

A modem 210 is a functional unit for connecting a public network 211 and the low-speed CPU bus 209. The modem 210 has a function of modulating digital data from the low-speed CPU bus 209 and outputting modulated data to the public network, and a function of demodulating the modulated data from the public network into digital data which can be processed in the image forming apparatus.

A LAN board 212, connected to LAN 213, serves as a functional unit for connecting the image forming apparatus to a local area network and exchanges data with the local area network. A computer interface (communication port) 214 serves as a functional unit for connecting the image forming apparatus to a computer (external apparatus). The computer interface 214 receives a control command from the computer to the image forming apparatus or transmits status information of the image forming apparatus to the computer. The computer interface 214 generally comprises an RS-232C for performing serial communication or a Centronics interface for performing parallel communication.

A panel interface (I/F) 215 is a unit that exchanges various control signals with an operation unit 221 in the image forming apparatus. The panel interface 215 transfers the signal of an input switch such as a key arranged on the operation unit 221 (to be described later) and performs resolution conversion for displaying the image data generated by the compressor/expander 207 on a liquid crystal display unit arranged on the operation unit 221.

The high-speed image bus 216 is a bus for connecting an image input/output bus in each image generating unit (the RIP 205, the image processor 206, or the compressor/expander 207) to a scanner interface (I/F) 217 (to be described later) and a printer interface (I/F) 219 (to be described later). This bus control is not managed by the CPU 201, but is managed by a bus controller 222 (to be described later), thereby performing data transfer.

A scanner unit 218 is a visible image reader having an automatic document feeder and has a 3-line RGB CCD color sensor. The scanner unit 218 scans an original to read an image on the original. Image data read by the scanner unit 218 is transferred to the high-speed image bus 216 by the scanner interface 217.

The scanner interface 217 has a function of performing optimal gradation conversion of the image data from the scanner unit 218 in accordance with the processing contents in the subsequent process, and converting read RGB (three primaries) color data into CMYBK data.

A printer unit 220 prints image data from the printer interface 219 (to be described later) as visible image data on recording paper. Examples of the printer unit 220 are a bubble jet printer for printing data on recording paper in accordance with a bubble jet scheme and a laser printer using an electrophotographic technique for forming an image on a photosensitive drum using a laser beam and forming this image on recording paper.

The printer interface 219 transfers image data from the high-speed image bus 216 to the printer unit 220. The printer interface 219 has a bus width conversion function for converting the bus width of the high-speed image bus 216 into a bus width matching the gradation of the printer, and a function of absorbing the difference between the printing speed of the printer and the image data transfer rate of the high-speed image bus 216.

The operation unit 221 has a liquid crystal display unit, a touch panel input device attached to the liquid crystal unit, and a plurality of hard keys. A signal input from the touch panel or a hard key is transmitted to the CPU 201 through the panel interface 215. The liquid crystal display unit displays image data sent from the panel interface 215. The liquid crystal display unit displays functions for operations in the image forming apparatus, image data, and the like.

The operation of the image transfer system of this embodiment will be described in detail with reference to the flow charts in FIGS. 3 to 7.

Figure 3:
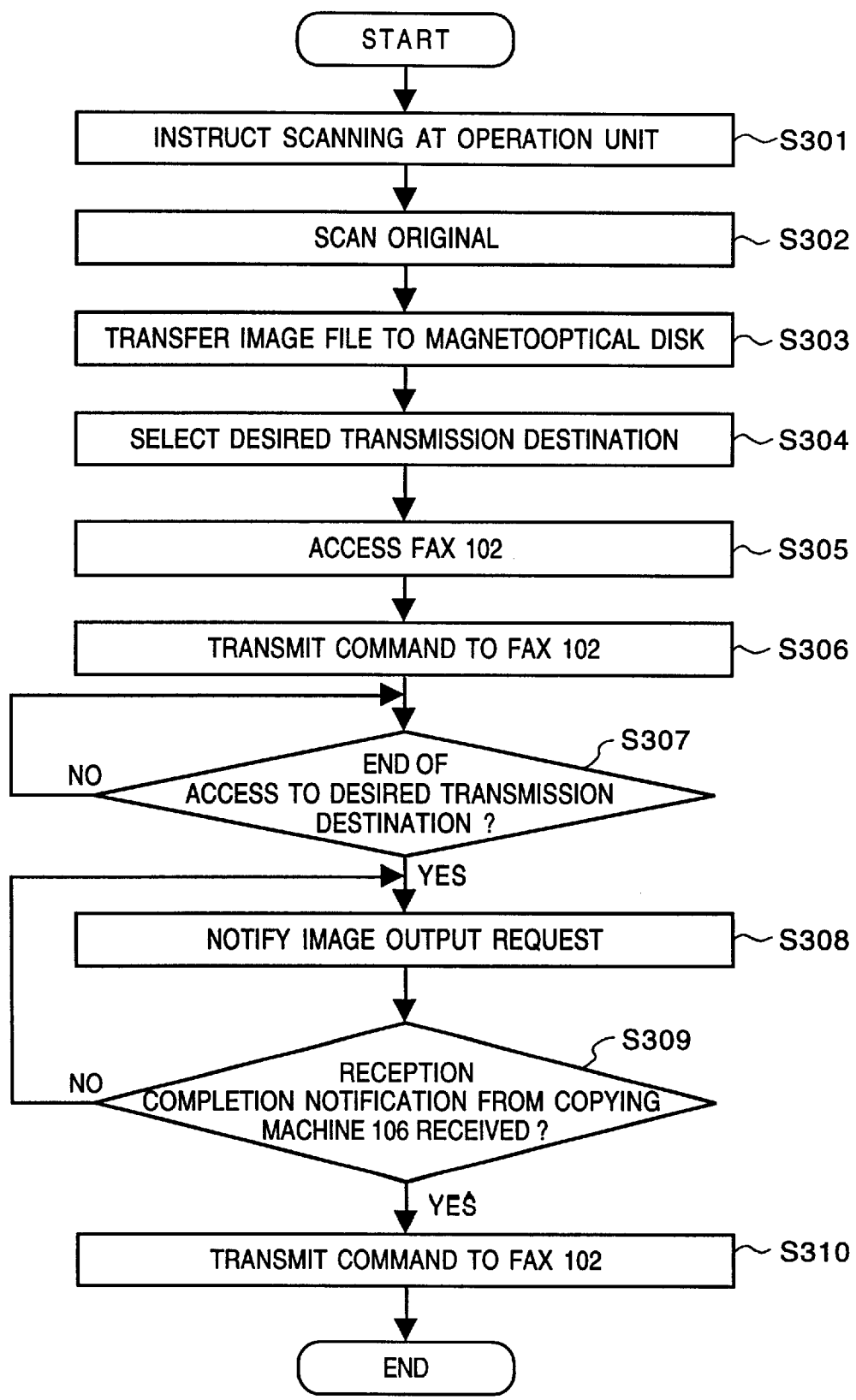
FIG. 3 is a flow chart showing the operation of a copying machine 101.
Figure 4:
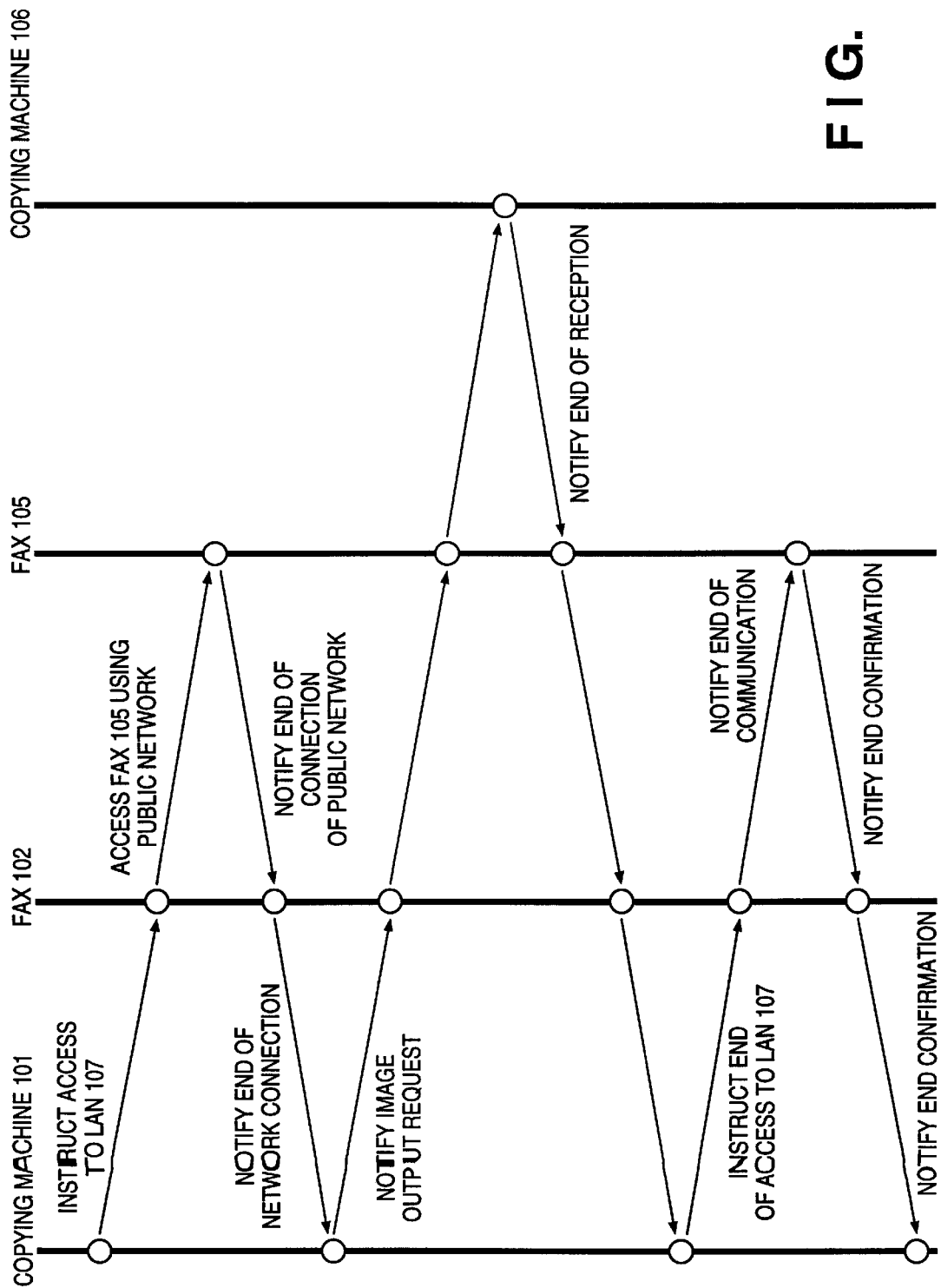
FIG. 4 is a sequence diagram showing access to a copying machine 106.

FIG. 3 is the flow chart showing the operation of the copying machine 101. When an instruction is input from the operation unit 221 so as to scan an original (step S301), the input instruction is interpreted by the panel interface 215. The resultant signal is input to the CPU 201. The CPU 201 causes the scanner 218 to scan the original through the bus controller 222 (step S302). The image data read by scanning is subjected to necessary processing such as gradation conversion in the image processor 206. The data is DMA-transferred from the CPU 201 to an external magnetooptical disk 224 (FIG. 2) using a bus master device 223 which has gained control of the high-speed bus 204, thereby filing the data (step S303). Note that a program operated by the CPU 201 can be changed to perform a scanning operation when notification of an image output request (representing the presence of image data to be transmitted in the disk) to the printer side (to be described later) is completed.

Figure 8:
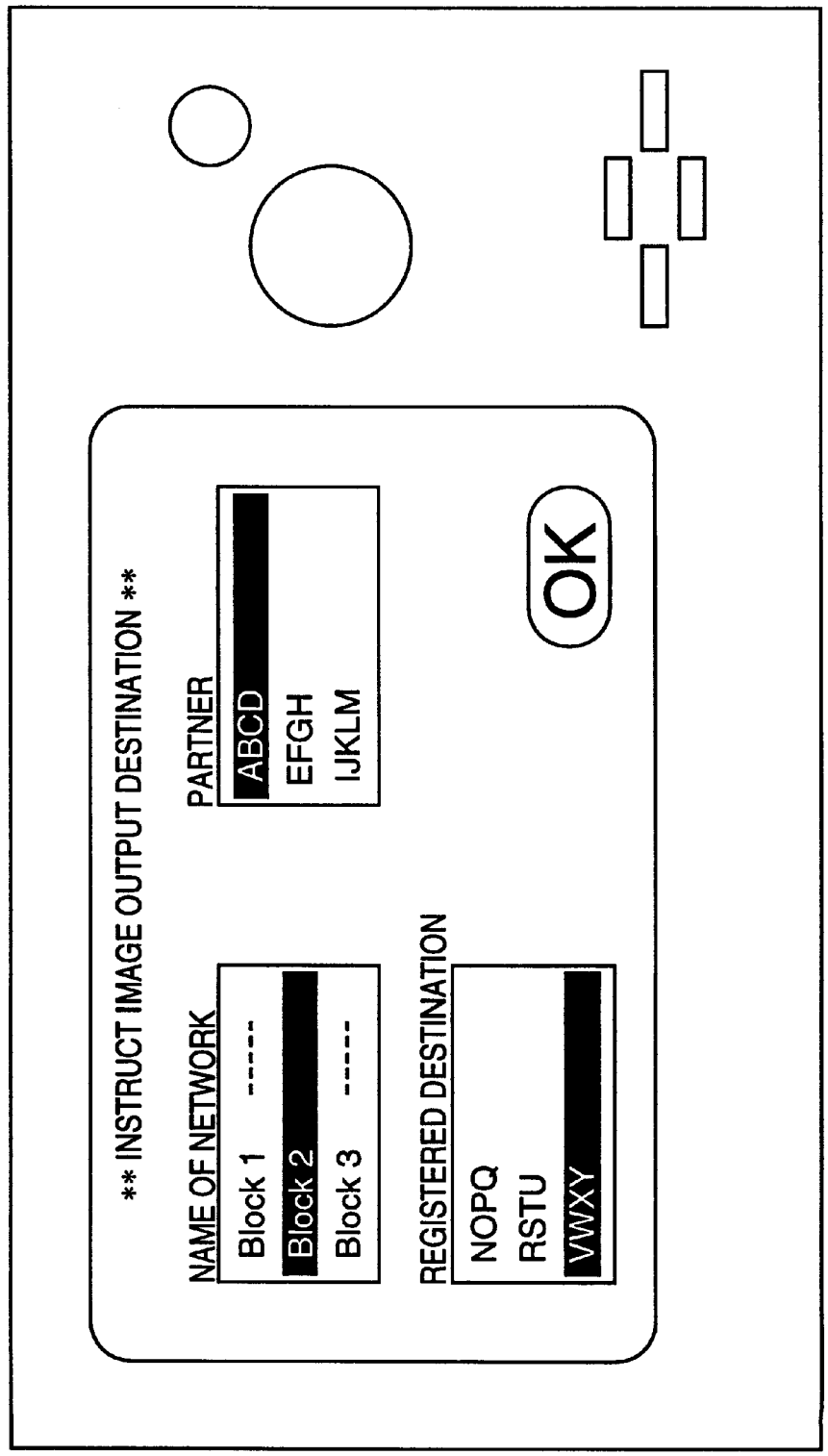
FIG. 8 is a view showing a window for selecting a desired output destination for image data.

When the scanning operation is completed in the copying machine 101, the CPU 201 so operates as to select a transmission destination for the image data obtained by scanning (step S304). At this time, the copying machine 101 is started, the network OS operates in the various devices in FIG. 1 under the control of the CPUs, and the copying machine 101 can communicate with other apparatuses on a LAN 213 using the LAN board 212. A printer which is present on the LAN 104 of the copying machine 101 and to which image data can be transferred from the copying machine 102 is displayed on the operation unit 221 on the basis of information obtained from the LAN board 212, as shown in FIG. 8. The network OS operating in the CPU 201 can use a plurality of protocols and automatically displays accessible devices on the LAN. Devices on a LAN except the LAN 104 can be registered in advance using the operation unit of the copying machine 101 and stored in the hard disk 202. In selecting a desired output destination for the scanned image data, the contents of the hard disk 202 are also displayed on the display unit, as shown in FIG. 8.

For example, when the copying machine 106 is selected on the display unit of the copying machine 101, an operation is started to connect another LAN using the public network in order to communicate with an apparatus on this LAN. Access to the copying machine 106 using the public network will be described with reference to the sequence diagram of FIG. 4.

The CPU 201 in the copying machine 101 receives the contents which are input from the display unit 221 upon an input operation by the operator and are interpreted by the panel interface 215 and detects an image output request for the copying machine 106. In this state, the CPU 201 loads the pre-registered telephone number of the FAX 105 from the hard disk 202 in order to access the LAN 107 on the basis of the information stored in the internal hard disk 202. The CPU 201 then accesses the FAX 102 similarly connected to the LAN 104 (step S305) and sends a command to the FAX 105 which can be connected to the different LAN 107 using the public network 108 (step S306).

Figure 5:
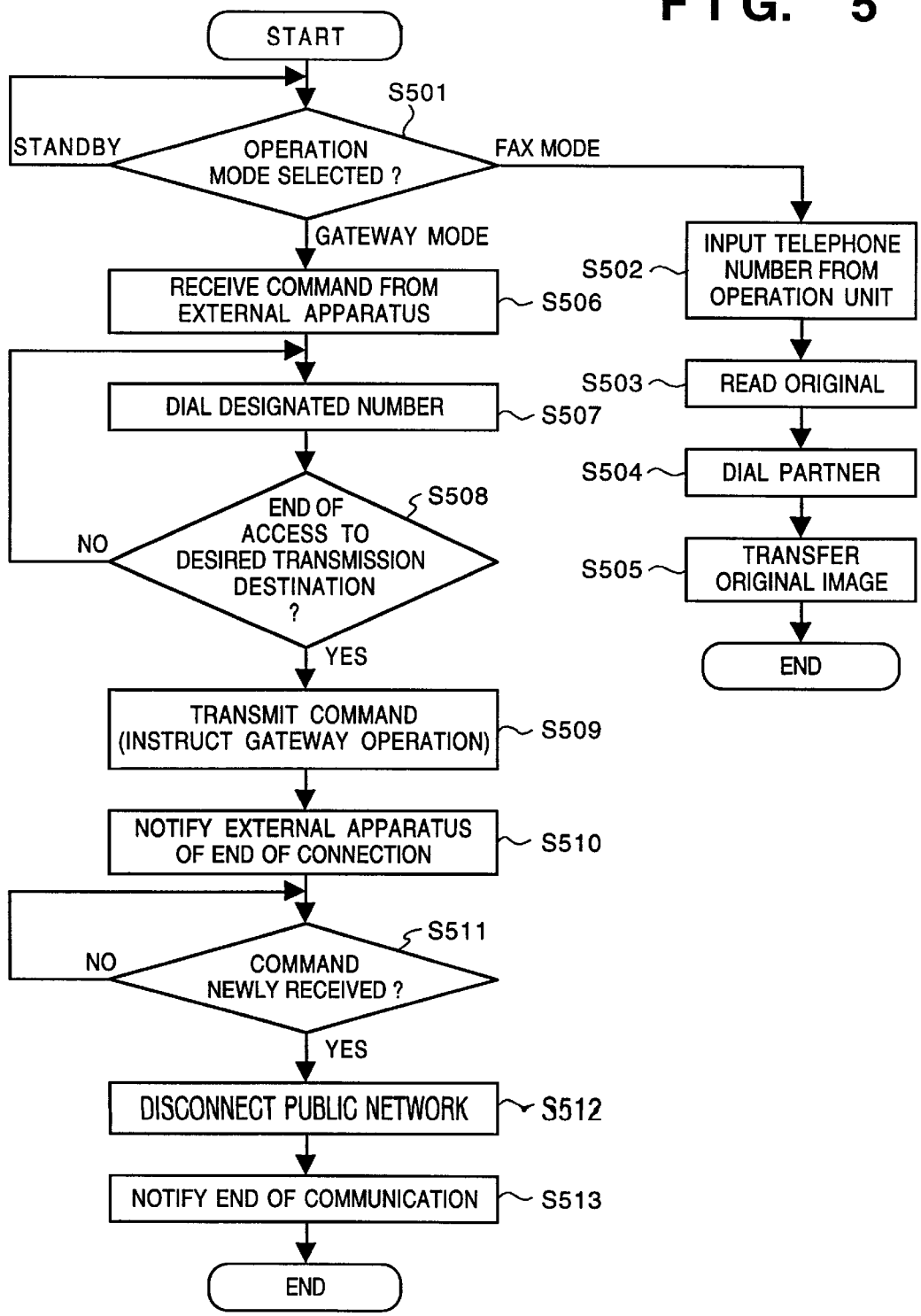
FIG. 5 is a flow chart showing the operation of a FAX 102.

FIG. 5 is the flow chart showing the operation of the FAX 102. When an instruction from the copying machine 10 is so received as to connect the FAX 105 through the public network, the CPU in the FAX 102 changes the operation mode to the gateway mode (step S501→step S506) to call the FAX 105 on the basis of the telephone number sent from the copying machine 101 (step S507). As shown in step S502 to S505, the FAX 102 has a function of normally scanning the placed original in accordance with an instruction from the operation unit and transmitting facsimile information to a destination similarly input from the operation unit. The FAX 102 also serves as a gateway for performing protocol conversion to connect another LAN through the public network in accordance with the input command and build a network with this LAN.

When the FAX 105 is connected through the public network (YES in step S508), the FAX 102 instructs the FAX 105 to operate in the gateway mode (step S509), thereby granting access to the LAN 107. In this state, the FAX 102 notifies the copying machine 101 of completion of access to the LAN 107 (step S510). When access to the LAN 107 is granted, the copying machine 101 notifies the copying machine 106 of an image output request (step S307→step S308). The FAX 102 then waits until reception completion notification for the image output request is received from the copying machine 106 (step S309). Upon receiving reception completion notification from the copying machine 106, a command for instructing disconnection of the public network is transmitted to the FAX 102 (step S310), and the operation is completed when information representing disconnection of the public network is notified from the FAX 102.

In response to the command for disconnecting the public network from the copying machine (YES in step S511), the FAX 102 transfers a command for canceling the gateway mode to the FAX 105. The FAX 102 disconnects the public network from the FAX 105 (step S512) and cancels its gateway mode. The FAX 102 notifies the copying machine of the disconnection of the public network (step S513) and returns to the standby state.

Figure 6:
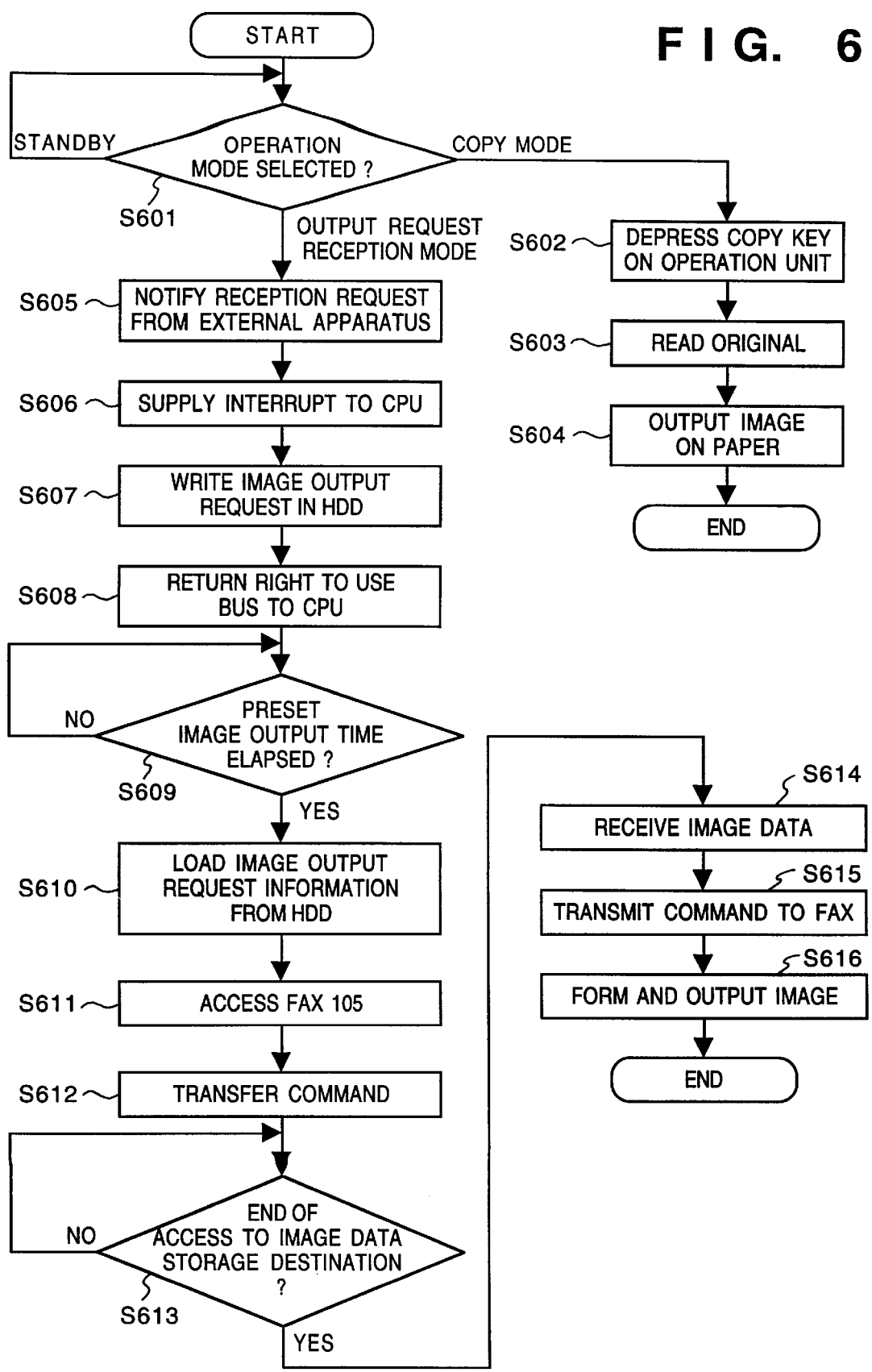
FIG. 6 is a flow chart showing the operation of the copying machine 106.

The operation of the copying machine 106 which has received the image output request will be described with reference to the flow chart of FIG. 6. When the copying machine 106 is accessed by the copying machine 101, the internal CPU 201 of the copying machine 106 is switched to the image output request reception mode (step S601→step S605). When the copy key is depressed on the operation unit of the copying machine 106, an original on an original table is scanned, and an image is formed and output on recording paper (steps S602 to S604).

When the copying machine 106 is then accessed by the copying machine 101, the LAN board 212 supplies an interrupt to the CPU 201 (step S606). This makes it possible to confirm that the copying machine 101 has transmitted the image output request. Information sent from the LAN board 212 is directly transferred to the HDD 202 through the bus bridge 208 (step S607). The image output request information stored in the HDD 202 includes the name of the copying machine 101 as a transmission source, the storage area of image data scanned by the copying machine 101, and a network protocol on the copying machine side. All the pieces of information required in subsequently transmitting the image data are included.

When image output request transfer to the HDD 202 is completed, the bus control is passed from the bus bridge 208 back to the CPU 201 (step S608), and the CPU 201 waits until an image output time preset by the user has elapsed (step S609). When the copy key is depressed on the operation unit of the copying machine 106, the mode shifts to the normal copy mode, and copying is performed. Alternatively, when an image output request is transmitted from another image reader or the like, the operations described above are repeated, and the image output request is stored in the HDD 202.

When the predetermined time present by the user on the operation unit has elapsed, the copying machine 106 reads out the image output request from the HDD 202 (step S610), and access to the area in which image data corresponding this request is stored is started.

Figure 7:
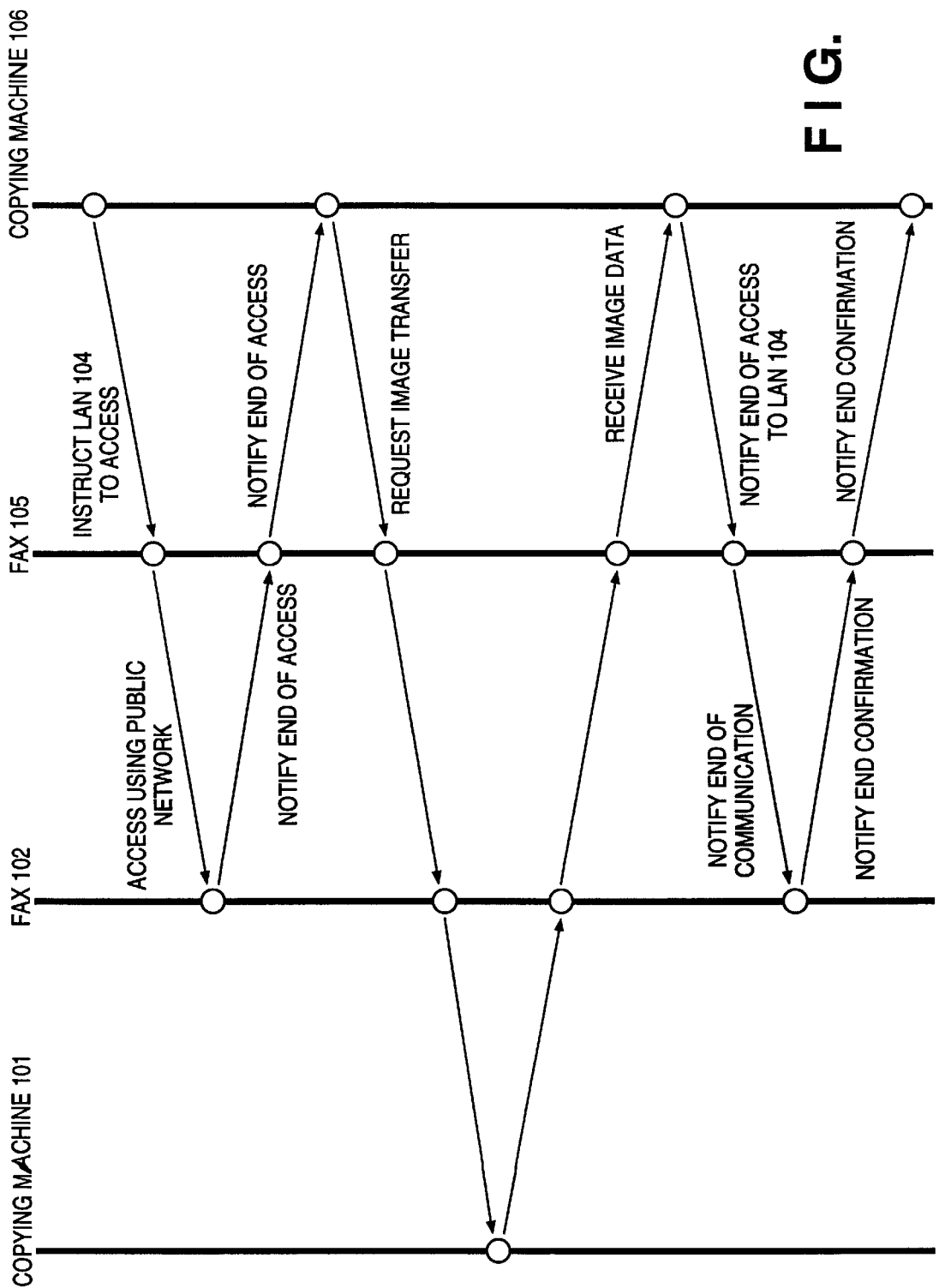
FIG. 7 is a sequence diagram in receiving image data at the copying machine 106.

FIG. 7 is the sequence diagram in receiving image data to the copying machine 106.

When the predetermined time preset by the user has elapsed, a timer interrupt is supplied to the internal CPU 201 of the copying machine 106. The CPU 201 changes the program to start an operation for receiving image data. When it is confirmed from the image output request information read out from the HDD 202 that the image data is stored in the magnetooptical disk connected to the copying machine 101, the dial number of the FAX 102 which is described in the image output request information is transmitted to the FAX 105 on the same LAN 107 (step S611). The CPU 201 directs the FAX 105 to dial the telephone number of the FAX 102 to connect the LAN 104. At this time, as described above, the FAX 102 and the FAX 105 shift the operation mode to the gateway mode to perform necessary protocol conversion, thereby connecting the LAN 104 to the LAN 107 (step S612).

When these LANs 104 and 107 are connected (YES in step S613), the copying machine 106 accesses the copying machine 101 through the internal LAN board 212 to transfer image data from the magnetooptical disk connected through the internal bus interface 223 (step S614). Upon reception of the image data, a command is transmitted to the FAX 105 (step S615) to notify disconnection of the public network from the FAX 102. When the FAX 102 receives the command, the FAX 102 directs the FAX 105 to cancel the gateway mode, thereby disconnecting the connected public network. The FAX 102 notifies the copying machine 106 of disconnection of the public network.

The copying machine 106 transfers the received image data to the image processor 206 through the internal bus bridge 208, and the image processor 206 performs necessary image processing such as gradation conversion. The processed data is transferred from the printer interface 219 to the printer unit 220 and printed thereat (step S616).

A plurality of times for storing image output requests and collectively outputting them in the copying machine 106 may be registered. When an image transmission destination is also designated from the copying machine 101 in which an original is scanned, a user name is also described in the image output request information. Image output can be started when each registered time designated by the user at the copying machine 106 has elapsed.

In transferring image data obtained by scanning an original, as described above, even if the image data cannot be immediately transferred to an image data transfer destination, only an image output request is notified to the transfer destination. The original image input source can be free from an image transfer operation, thereby reducing the load. In transferring images using the public network, by collectively outputting the image output requests, the images can be transferred in a time zone when the charge for the public network is lowest. In addition, when a plurality of image output time zones are set for the respective users, the use times can be assigned in units of users to some extent to increase the use efficiency. At the same time, the images are output in units of users, so that each user need not find an image sent to him from all the output images.

[Second Embodiment]

The second embodiment of the present invention will be described in detail with reference to the accompanying drawings.

Figure 9:
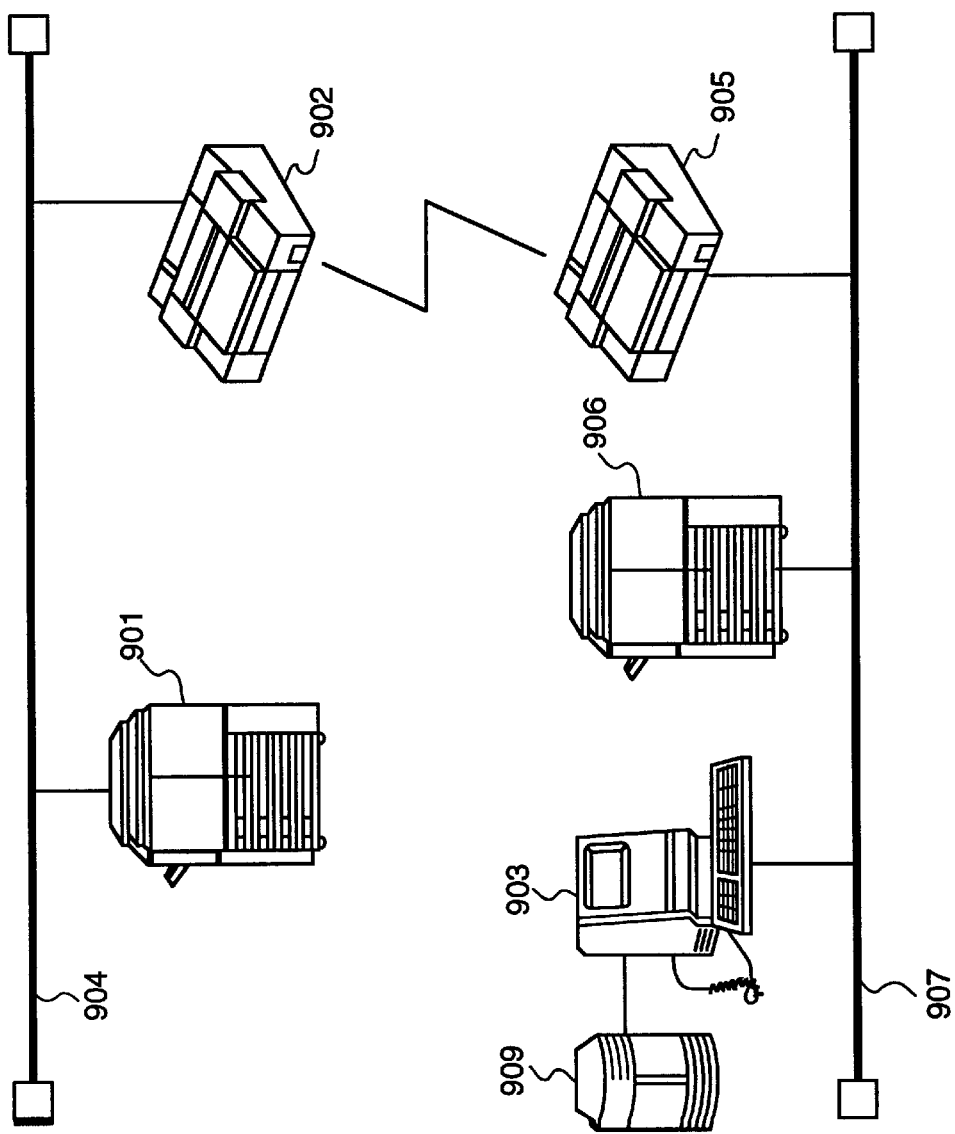
FIG. 9 is a block diagram showing the arrangement of an image transfer system according to the second embodiment of the present invention.

FIG. 9 is a block diagram showing the system configuration of the second embodiment. The arrangement of the second embodiment is different from that of the first embodiment (FIG. 1) in that a general-purpose computer 903 connected to the same LAN 907 as for a copying machine 906 and a large-capacity hard disk 909 connected to the general-purpose computer 903 are newly added.

Figure 10:
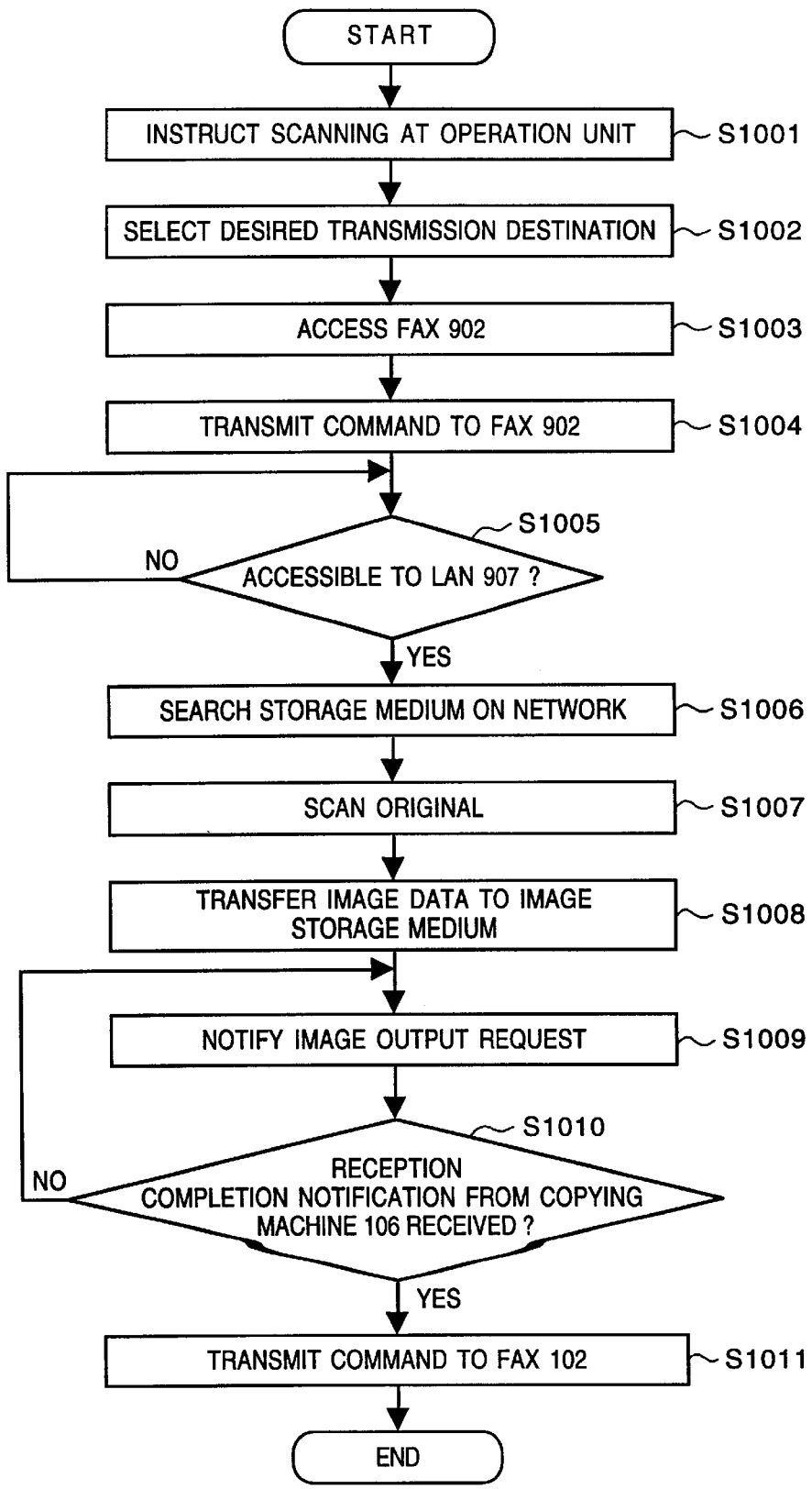
FIG. 10 is a flow chart showing the operation of a copying machine 901.

The operation of a copying machine 901 shown in FIG. 9 will be described with reference to a flow chart in FIG. 10.

When an instruction is input from an operation unit 221 to make the copying machine 901 scan an original (step S1001), this instruction is interpreted by a panel interface 215 and transmitted to a CPU 201. The CPU 201 in the copying machine 901 operates to select a transmission destination for image data obtained by scanning (step S1002). As shown in FIG. 8, a desired output destination for the scanned image data is selected on the operation unit 221.

Figure 11:
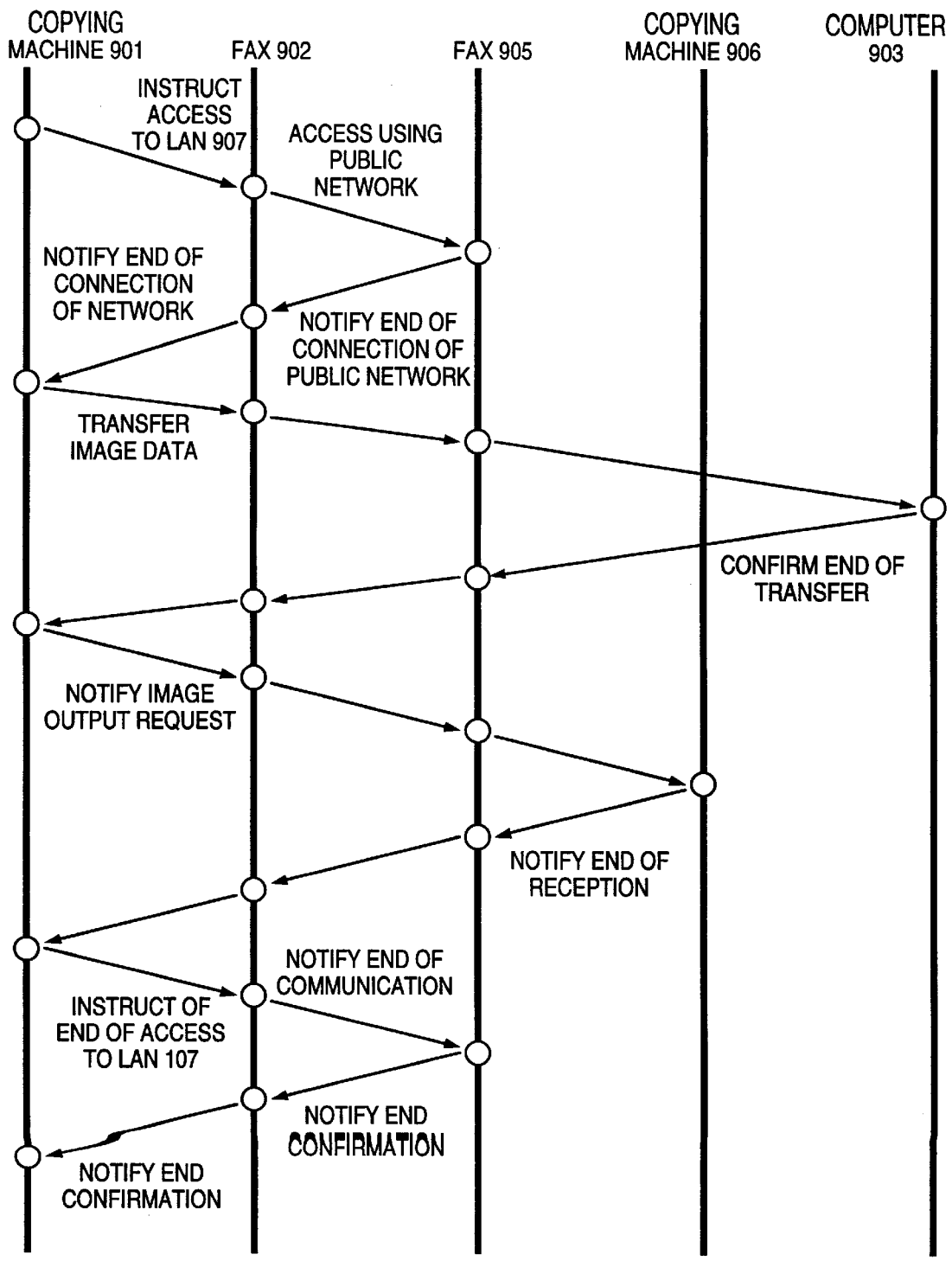
FIG. 11 is a sequence diagram showing access to a general-purpose computer 903.

For example, when the copying machine 906 is selected on the operation unit of the copying machine 901, an operation is started to connect another LAN 907 using a public network in order to allow the copying machine 901 to communicate with the copying machine 906 on the LAN 907. Access to the LAN 907 using the public network will be described with reference to a sequence diagram in FIG. 11.

The CPU 201 in the copying machine 901 receives the contents input from the display unit 221 and interpreted by the panel interface 215 and detects that image output is requested for the copying machine 106. In this state, as in the previous embodiment, the LAN 907 is accessed using FAXs 902 and 905 (steps S1003 to S1005).

When access to the LAN 907 is granted, the copying machine 901 accesses one of the apparatuses on the LAN 907 which has a medium for storing image data and an empty area capable of storing the image data in order to temporarily store the image obtained by scanning (step S1006). When the copying machine 901 confirms that the image data can be stored, the copying machine 901 starts a scanning operation (step S1007).

Assume that the large-capacity HDD 909 is connected to the general-purpose computer 903 connected to the LAN 907. Note that a real-time OS runs on the general-purpose computer 903, and a program can be switched in accordance with an instruction form the copying machine 901 to allow transfer of data on the LAN 907 to the large-capacity HDD.

When the copying machine 901 transfers the image data obtained by scanning to the HDD 909 (step S1008), the copying machine 901 accesses the copying machine 906 in the same manner as in the previous embodiment to transfer an image output request to an HDD 202 in the copying machine 906 (S1009). At this time, as a location where the image data is stored, the name of the large-capacity HDD 909 connected to the general-purpose computer 903 on the LAN 907 is included in the image output request information. When it is confirmed in the copying machine 901 that the image output request has been notified to the copying machine 906 (S1010), the copying machine 901 instructs the FAX 502 to disconnect the public network, thereby perfectly completing the operation associated with the scanned image output (S1011).

In the copying machine 906, when a predetermined time preset by the user has elapsed, the image output request stored in the internal HDD 202 in the copying machine 906 is read out to access the area where the image data is stored. When the location where the image data is stored is recognized as the large-capacity HDD 909 connected to the general-purpose computer 903 on the LAN 907, the general-purpose computer 903 is accessed to transfer the image data. The image output is then performed in the same manner as in the previous embodiment.

As described above, even if the copying machine 901 as the transmission source and the copying machine 906 as the reception destination do not have storage media which do not have a sufficient area for storing the image data, a storage medium on the network can be shared to release the copying machine 901 from the image transfer operation and start a copying operation upon the elapse of the arbitrary time reset in the copying machine 906. Therefore, the use efficiency of the LAN can be increased.

Image data can be temporarily stored on the same LAN as for the image forming apparatus serving as the image data output destination, even image data sent from another LAN need not be transferred using the public network again. Therefore, as compared with the previous embodiment, image data transfer cost can be reduced.

[Third Embodiment]

The third embodiment of the present invention will be described with reference to the accompanying drawings.

Figure 12:
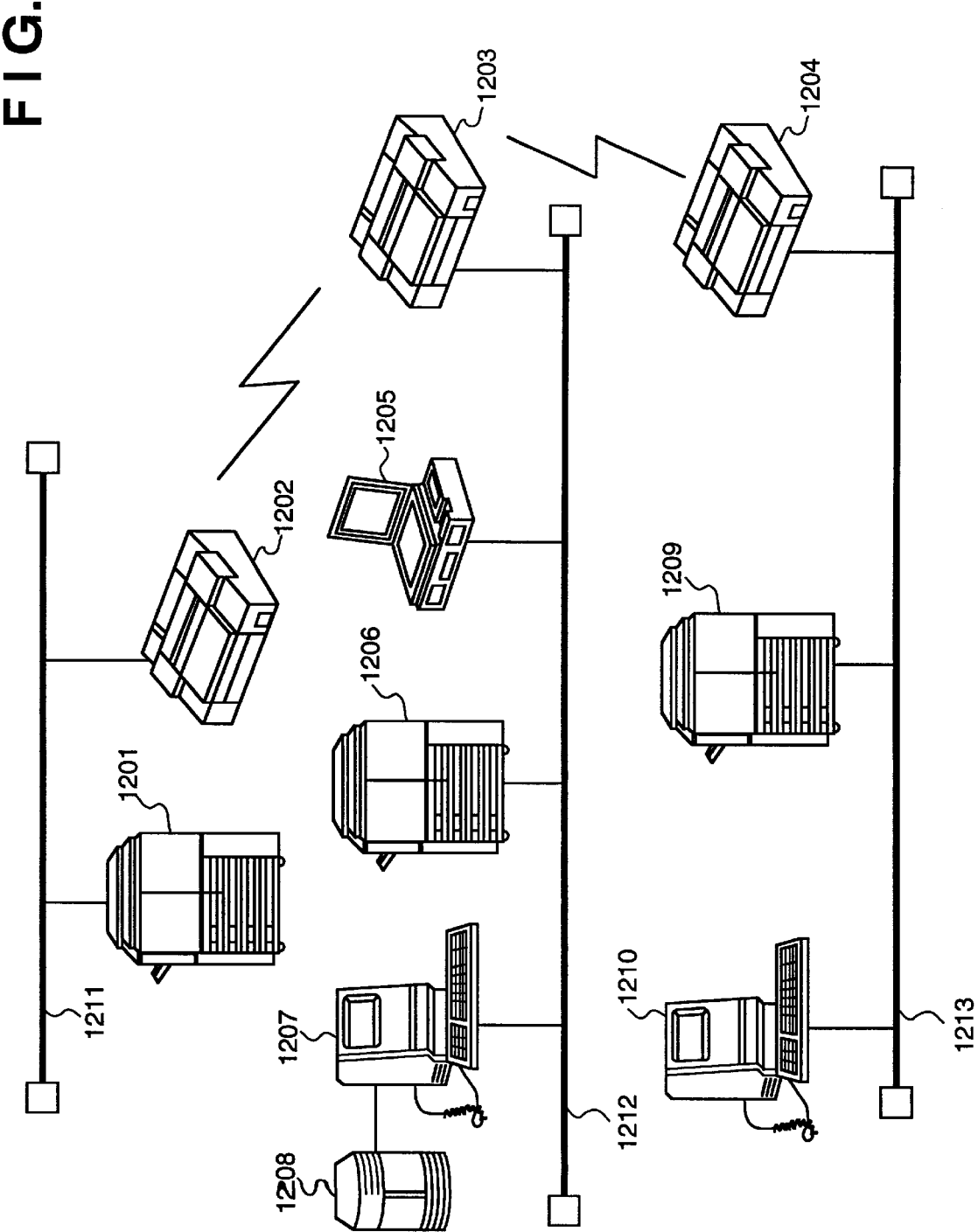
FIG. 12 is a block diagram showing the arrangement of an image transfer system according to the third embodiment of the present invention.

FIG. 12 is a block diagram showing the system configuration of the third embodiment. Referring to FIG. 12, reference numerals 1201, 1206 and 1209 denote identical image forming apparatuses or copying machines having large liquid crystal touch panels and connected to LANs 1211, 1212 and 1213, respectively. Each copying machine has a scanning function and a printer function. The copying machine has a copying function as a stand-alone machine.

Reference numerals 1202, 1203, and 1204 denote image forming apparatuses or FAXs having large liquid crystal touch panels. These FAXs are connected to a public network. When the copying machines 1201, 1206, and 1209 are sequentially accessed to connect a device on another LAN, the FAXs serve as gateways for protocol compatibility. Each FAX has a simple copying function and a FAX function as a stand-alone machine.

Reference numerals 1207 and 1210 denote computers normally used by users. Each computer creates a document or exchanges an electronic mail with another computer connected to a LAN. A large-capacity hard disk is connected to the general-purpose computer 1207 through a general-purpose interface connected thereto. The computer 1207 can have a function as an image filing apparatus.

Reference numeral 1205 denotes a scanner having a large liquid crystal touch panel. The scanner 1205 transfers image data of the scanned original to another image forming apparatus or a general-purpose computer on a LAN through a LAN interface.

Note that an image forming apparatus such as the copying machine described above has a common hardware arrangement.

In the system shown in FIG. 12, for example, to output image data obtained upon scanning an original in the copying machine 1201, image data obtained by scanning an original at the scanner 1205, and image data generated by the general-purpose computer 1210 from the copying machine 1206 connected on a LAN 1212, image output requests are transferred to the copying machine 1206, and the corresponding image data are temporarily stored in a large-capacity HDD 1208 connected to the general-purpose computer 1207 on the LAN 1212.

Processing for transmitting the image output requests to the copying machine 1206 and processing for transferring the image data to the large-capacity HDD 1208 are identical to processing described in the second embodiment. Note that the data to be transferred from the general-purpose computer 1210 is described in PDL codes.

Processing for allowing a user who is outputting an image at the copying machine 1206 to output image data of an image output request addressed to the copying machine 1206 by using the copying machine 1209 will be described below. Note that the copying machine 1209 has an internal RIP board 205 to develop a raster image at a higher resolution than that of the copying machine 1206 and can output an image at a higher resolution than that of the copying machine 1206.

Figure 13:
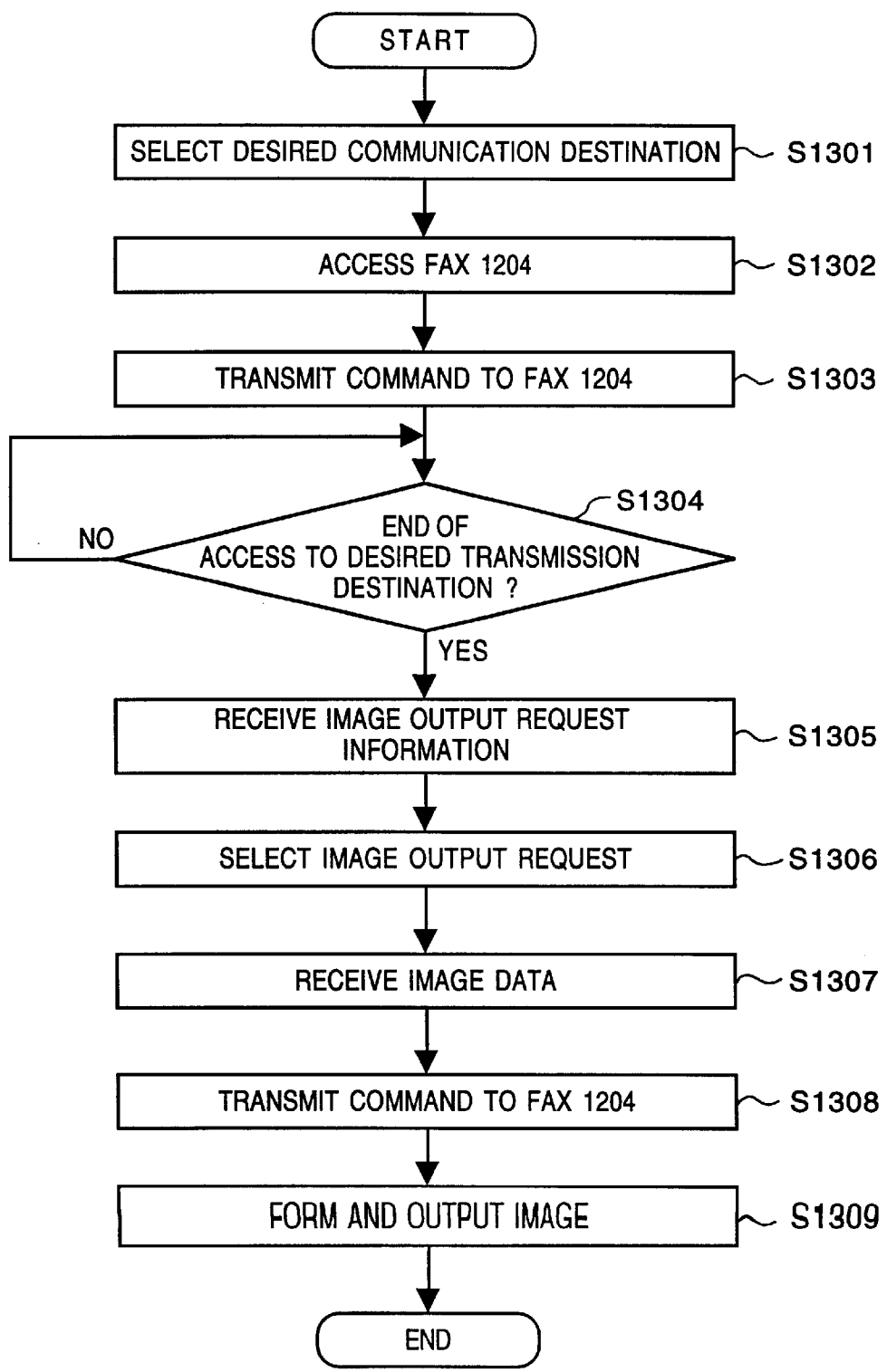
FIG. 13 is a flow chart showing the operation of a copying machine 1209.

The operation of the copying machine 1209 will be described in detail with reference to a flow chart shown in FIG. 13.

The user operates the operation unit of the copying machine 1209 to display connectable apparatuses, as shown in FIG. 8 and selects a desired apparatus from the connectable apparatuses (step S1301). When the user selects the copying machine 1206, a command is transmitted to the FAX 1204 as in the previous embodiment to connect the FAX 1204 (step S1302) to the FAX 1203 through the public network (step S1303). The FAXs 1204 and 1203 then operate as gateways to allow communication between the copying machines 1209 and 1206 (step S1304). The copying machine 1209 which is allowed to communicate with the copying machine 1206 transfers the contents of the image output request stored in an internal HDD 202 in the copying machine 1206. At this time, the contents of the HDDs of the copying machines 1206 and 1209 can be shared by the network OS running in CPUs 201 in the copying machines 1206 and 1209. In this case, a password may be set for a specific user.

When the contents of the image output request are transferred from the copying machine 1206 (step S1305), the image output request is temporarily stored in a work memory 203 through a LAN board 212 and a bus bridge 208 of the copying machine 1209. The storage contents are displayed on a large liquid crystal display of the operation unit 221 of the copying machine 1209 through a panel interface 215, as shown in FIG. 14. The user refers to this image output request list and inputs at the operation unit of the copying machine 1209 the registration number of the name of case of a desired output image, thereby selecting the image output request (step S1306). Assume that image data created by a general-purpose computer on a LAN 713 and stored in a large-capacity HDD 708 through a general-purpose computer 707 on a LAN 712.

When the user inputs the registration number of the desired image output request, the CPU 201 in the copying machine 1209 confirms the location where image data contained in the selected image output request information in the work memory 203 is stored. Since the location where the image data is stored is the large-capacity HDD 708 connected to the general-purpose computer on the LAN 712, the copying machine 1209 uses the FAXs 1204 and 1203 as gateways to transfer the image data from the large-capacity HDD 708 (step S1307). Upon completion of the image data, the copying machine 1209 transmits a command to the FAX 1204 (step S1308) to disconnect the FAX 1203 from the public network, thereby completing communication with the FAX 1204.

The image data described in RIP codes and transferred from the large-capacity HDD 708 is developed as raster image in the RIP board 205 through the LAN board 212 and the bus bridge 208 in the copying machine 1209 and stored in the internal memory of the RIP board 205. Upon completion of image development, the image data is transferred from the internal memory of the RIP board 205 to the printer interface. The data is visually output on recording paper at a printer unit 220 (step S1309).

As described above, the contents of an image output request are disclosed for even image data addressed to a given image forming apparatus to allow image output at another image forming apparatus, thereby forming an image transfer system having a higher efficiency. The user can easily output an image from an image forming apparatus having another resolution.

Note that the present invention is applicable to a system constituted by a plurality of devices (e.g., a host computer, interface devices, a reader, and a printer) or an apparatus (e.g., a copying machine or a facsimile apparatus) constituted by one device.

The objects of the present invention can also be achieved such that a storage medium which stores the program codes of software for realizing the functions of the above embodiments is supplied to the system or apparatus, and a computer (CPU or MPU) in the system or apparatus reads out the program codes from the storage medium and execute the readout program codes, as a matter of course.

In this case, the program codes themselves read out from the storage medium realize the functions of the above embodiments, and the storage medium which stores the program codes constitutes the present invention.

Examples of the storage medium which supplies the program codes are a floppy disk, a hard disk, an optical disk, a magnetooptical disk, a CD-ROM, a CD-R, a magnetic tape, a nonvolatile memory card, and a ROM.

By executing the program codes read out by the computer, not only the functions of the above embodiments are achieved, but also the functions of the above embodiments can be achieved by some or all actual processing operations executed by an OS (Operating System) running on the computer on the basis of the instructions of the program codes.

The program codes read out from the storage medium can be written in a memory arranged on a function expansion board inserted into a computer or a function expansion unit connected to the computer, and a CPU or the like of the function expansion board or the function expansion unit can execute some or all actual processing operations to realize the functions of the above embodiments, as a matter of course.

According to the embodiments described above, there can be provided an image transfer system and method capable of improving convenience of the user and system and achieving efficient image transfer using a communication line and a network.

As many apparently widely different embodiments of the present invention can be made without departing from the spirit and scope thereof, it is to be understood that the invention is not limited to the specific embodiments thereof except as defined in the appended claims.

What is claimed is:

1. A data communication system comprising:
   a memory adapted to store data to be provided to a partner;
   a transmitter circuit adapted to transmit, through a line to the partner, information representing a presence of data to be provided to the partner, stored in said memory, and to cease communication with the partner after the information is transmitted;
   a receiver circuit adapted to resume the communication with the partner to which the information is transmitted by said transmitter circuit through the line, and to receive from the partner an instruction for requesting the data corresponding to the information transmitted by said transmitter circuit; and
   a transfer circuit adapted to transfer the data stored in said memory to the partner through the line in response to the instruction for requesting the data received by said receiver circuit.

2. The system according to claim 1, wherein
   said transmitter circuit disconnects a telephone line after the information is transmitted through the telephone line, and
   said receiver circuit reconnects the telephone line based on a request from the partner for receiving data corresponding to the information transmitted by said transmitter circuit.

3. The system according to claim 1, wherein the information transmitted by said transmitter circuit includes information representing a storage area of said memory for data to be transferred by said transfer circuit.

4. A computer-readable storage medium storing a program for implementing a data communication method, the program comprising:
   code for a transmission step of transmitting, through a line to a partner, information representing a presence of data to be provided to the partner, the data stored in a memory, and of ceasing communication with the partner after the information is transmitted;
   code for a reception step of resuming the communication with the partner to which the information is transmitted in said transmission step, through the line, and of receiving from the partner an instruction for requesting the data corresponding to the information transmitted in the transmission step; and
   code for a transfer step of transferring to the partner the data stored in the memory through the line in response to the instruction for requesting the data received in the reception step.

5. A data communication system comprising:
   a receiver circuit adapted to receive a plurality of pieces of information representing a presence of data to be supplied from a partner through a line, and to cease communication with the partner after the pieces of information are received;
   a memory adapted to store the plurality of pieces of information, representing the presence of data to be supplied, received by said receiver circuit;
   a selection circuit adapted to select desired information from among the plurality of pieces of information, representing the presence of data to be supplied, stored in said memory; and
   a requesting circuit adapted to resume communication with the partner, which transmitted the plurality of pieces of information received by said receiver circuit, through the line, and to request the partner to transfer data corresponding to the desired information selected by said selection circuit.

6. The system according to claim 5, further comprising a display unit adapted to display a list based on the information received by said receiver circuit,
   wherein said selection circuit selects, by manual instruction, the desired information from the list displayed by said display unit.

7. The system according to claim 5, wherein said requesting circuit performs an outgoing call to the partner at a predetermined timing.

8. A method of using a data communication system, comprising:
   a transmission step of transmitting through a line to a partner information representing a presence of data to be provided to the partner, the data stored in a memory, and of ceasing communication with the partner after the information is transmitted;
   a reception step of resuming communication with the partner to which the information is transmitted in said transmission step, through the line, and of receiving from the partner an instruction for requesting the data corresponding to the information transmitted in said transmission step; and
   a transfer step of transferring the data stored in the memory to the partner through the line in response to the instruction for requesting the data received in said reception step.

9. A computer-readable storage medium storing a program for implementing a data communication method, the program comprising:
   code for a reception step of receiving a plurality of pieces of information representing a presence of data to be supplied from a partner through a line, and of ceasing communication with the partner after the pieces of information are received;
   code for a storage step of storing to a memory the plurality of pieces of information, representing the presence of data to be supplied, received in the reception step;

code for a selection step of selecting desired information from among the plurality of pieces of information, representing the presence of data to be supplied, stored in the memory in the storage step; and code for a requesting step of resuming communication with the partner, which transmitted the plurality of pieces of information received in said reception step, through the line, and of requesting the partner to transfer data corresponding to the desired information selected in the selection step.

10. A method of using a data communication system, comprising:

a reception step of receiving a plurality of pieces of information representing a presence of data to be supplied from a partner through a line, and of ceasing communication with the partner after the pieces of information are received;

a storage step of storing to a memory the plurality of pieces of information, representing the presence of data to be supplied, received in said reception step;

a selection step of selecting desired information from among the plurality of pieces of information, representing the presence of data to be supplied, stored in the memory in said storage step; and a requesting step of resuming communication with the partner, which transmitted the plurality of pieces of information received in said reception step, through the line, and of requesting the partner to transfer data corresponding to the desired information selected in said selection step.

* * * * *

UNITED STATES PATENT AND TRADEMARK OFFICE
CERTIFICATE OF CORRECTION

PATENT NO. : 6,160,638
DATED : December 12, 2000
INVENTOR(S) : Masataka Yasuda

It is certified that error appears in the above-identified patent and that said Letters Patent is hereby corrected as shown below:

Column 7,
Line 66, "901" should read -- 901 (S1009) --.

Column 8,
Line 5, "907" should read -- 907 (S1010) --.
Line 8, "image data" should read -- image data (S1011) --.
Line 17, "form" should read -- from --.

Signed and Sealed this

Second Day of October, 2001

Attest:

NICHOLAS P. GODICI
Attesting Officer    Acting Director of the United States Patent and Trademark Office